US011876866B2

(12) United States Patent
Chen et al.

(10) Patent No.: US 11,876,866 B2
(45) Date of Patent: Jan. 16, 2024

(54) METHOD FOR ASSISTING UNREGISTERED USER DEVICE TO ACCESS END-TO-END CALL SERVICE OF PRIVATE NETWORK AND COMMUNICATION SYSTEM

(71) Applicant: Industrial Technology Research Institute, Hsinchu (TW)

(72) Inventors: Jian Cheng Chen, Taoyuan (TW); Tsun-Chieh Chiang, Changhua County (TW); Kuo-Wei Wen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 15 days.

(21) Appl. No.: 17/558,599

(22) Filed: Dec. 22, 2021

(65) Prior Publication Data

US 2023/0171577 A1    Jun. 1, 2023

(30) Foreign Application Priority Data

Nov. 29, 2021  (TW) ................................ 110144440
Nov. 29, 2021  (TW) ................................ 110144441

(51) Int. Cl.
*H04L 67/141*  (2022.01)
*H04L 67/306*  (2022.01)
*H04L 65/403*  (2022.01)
*H04L 67/10*  (2022.01)
*H04W 4/90*  (2018.01)
*H04L 65/1096*  (2022.01)

(52) U.S. Cl.
CPC ........ *H04L 67/141* (2013.01); *H04L 65/1096* (2013.01); *H04L 65/403* (2013.01); *H04L 67/10* (2013.01); *H04L 67/306* (2013.01); *H04W 4/90* (2018.02)

(58) Field of Classification Search
CPC ..... H04L 65/1096; H04L 65/403; H04W 4/90
USPC ....................................... 455/404.1
See application file for complete search history.

(56) References Cited

U.S. PATENT DOCUMENTS 7,154,995 B1    12/2006  Wilson et al.
8,538,374 B1    9/2013  Haimo et al.
(Continued)

FOREIGN PATENT DOCUMENTS

CN    102065068    5/2011
CN    111050324    4/2020
(Continued)

OTHER PUBLICATIONS

"Office Action of Taiwan Related Application No. 110144441", dated Sep. 5, 2022, pp. 1-7.
(Continued)

*Primary Examiner* — Maria El-Zoobi
(74) *Attorney, Agent, or Firm* — JCIPRNET

(57) ABSTRACT

The disclosure provides a method for assisting an unregistered user device to access an end-to-end call service of a private network and a communication system. The method includes: determining whether the user device that is not registered on the private network wants to initiate a request of an emergency call; in response to determining that the user device that is not registered on the private network wants to initiate the request of the emergency call, assisting the user device to access the end-to-end call service without being registered on the private network.

14 Claims, 7 Drawing Sheets

(56) References Cited

U.S. PATENT DOCUMENTS

| | | | |
|---|---|---|---|
| 9,002,314 B2* | 4/2015 | Le Creff | H04L 67/04 455/404.1 |
| 10,285,155 B1 | 5/2019 | Dodd-Noble et al. | |
| 10,455,536 B1* | 10/2019 | Khawand | H04B 1/3816 |
| 10,506,506 B2 | 12/2019 | Qiao et al. | |
| 10,674,319 B1 | 6/2020 | Chandra Mondal et al. | |
| 10,972,575 B2 | 4/2021 | Li et al. | |
| 11,184,647 B1 | 11/2021 | Khalid et al. | |
| 2012/0129482 A1* | 5/2012 | Li | H04M 3/42195 455/404.1 |
| 2014/0150070 A1 | 5/2014 | Peterson | |
| 2017/0135059 A1 | 5/2017 | Taneja et al. | |
| 2018/0220301 A1 | 8/2018 | Gallagher et al. | |
| 2020/0221529 A1 | 7/2020 | Park et al. | |
| 2020/0374143 A1 | 11/2020 | Mukherjee et al. | |

FOREIGN PATENT DOCUMENTS

| | | |
|---|---|---|
| CN | 111163467 | 5/2020 |
| CN | 110996303 | 11/2020 |
| CN | 113228570 | 8/2021 |
| JP | 2008518494 | 5/2008 |
| JP | 2009535948 | 10/2009 |
| JP | 2013531446 | 8/2013 |
| TW | 202021384 | 6/2020 |
| TW | 202121910 | 6/2021 |

OTHER PUBLICATIONS

Shih-Chun Huang et al., "Application-Aware Traffic Redirection: A Mobile Edge Computing Implementation Toward Future 5G Networks", 2017 IEEE 7th International Symposium on Cloud and Service Computing, Nov. 2017, pp. 17-23.

E.Schiller et al., "CDS-MEC: NFV/SDN-based Application Management for MEC in 5G Systems", Computer Networks, Jan. 9, 2018, pp. 1-20.

Jianbing Ni et al., "Efficient and Secure Service-Oriented Authentication Supporting Network Slicing for 5G-Enabled IoT", IEEE Journal on Selected Areas in Communications, Mar. 12, 2018, pp. 644-657.

Cesar A. Garcia-Perez et al., "Enabling low latency services in standard LTE networks", 2016 IEEE 1st International Workshops on Foundations and Applications of Self-* Systems, Sep. 2016, pp. 248-255.

Johnson Opadere et al., "Energy-Efficient Virtual Radio Access Networks for Multi-Operators Cooperative Cellular Networks", IEEE Transactions on Green Communications and Networking, May 13, 2019, pp. 1-12.

Ruben Solozabal et al., "Exploitation of Mobile Edge Computing in 5G Distributed Mission-Critical Push-to-Talk Service Deployment", IEEE Access, Jun. 20, 2018, pp. 1-11.

Syed Husain et al., "Mobile edge computing with network resource slicing for Internet-of-Things", 2018 IEEE 4th World Forum on Internet of Things (WF-IoT), May 7, 2018, pp. 1-6.

Evelina Pencheva et al., "Open Access to Intersystem Handover Control Using Multi-access Edge Computing", 2018 International Symposium on Networks, Computers and Communications (ISNCC), Nov. 12, 2018, pp. 1-7.

Hye Rim Cheon et al., "Traffic Offloading Algorithm Using Social Context in MEC Environment", The Journal of Korean Institute of Communications and Information Sciences, with English abstract, Feb. 28, 2017, pp. 1-10.

"Office Action of Taiwan Counterpart Application", dated May 26, 2022, p. 1-p. 7.

"Office Action of Japan Counterpart Application", dated Mar. 28, 2023, p. 1-p. 2.

"Office Action of Japan Related Application, Application No. 2021-209096", dated Mar. 14, 2023, p. 1-p. 3.

* cited by examiner

METHOD FOR ASSISTING UNREGISTERED USER DEVICE TO ACCESS END-TO-END CALL SERVICE OF PRIVATE NETWORK AND COMMUNICATION SYSTEM

CROSS-REFERENCE TO RELATED APPLICATION

This application claims the priority benefit of Taiwan application serial no. 110144440, filed on Nov. 29, 2021, and Taiwan application serial no. 110144441, filed on Nov. 29, 2021. The entirety of each of the above-mentioned patent applications is hereby incorporated by reference herein and made a part of this specification.

TECHNICAL FIELD

The disclosure relates to a technology for accessing services of a private network, and relates to a method for assisting an unregistered user device to access services of a private network and a communication system.

BACKGROUND

Please refer to FIG. 1A, which is a schematic diagram for a conventional user device to access the Internet. In FIG. 1A, a user device 110 is, for example, a registered/authorized user of a operator A, but is not a registered/authorized user of the operator B and the operator C. When the user device 110 is within the service range of the operator A, the user device 110 can access the Internet through the operator A. And when the user device 110 is within the service range of the operator B, if the user device 110 is authorized to use the roaming service through the operator B, the user device 110 can access the Internet through the operator B and the operator A.

However, if the user device 110 uses the telecommunication service through the operator C without authorization, the user device 110 can only perform functions like initiating an emergency call through the operator C without accessing the Internet through the operator C.

Please refer to FIG. 1B, which is another schematic diagram of accessing the Internet based on the conventional user device shown in FIG. 1A. It is assumed in FIG. 1B that the operator A supports new radio (NR), and the user device 110 can use the service such as Voice over New Radio (VoNR) through the operator A. However, since the user device 110 is not a registered user of the operator C (for example, it maintains a private network), even if the operator C provides VoNR and other services to its registered users (for example, a user device 120), the user device 110 can only use the emergency call service of the operator C. In this scenario, even if the registered users of operator C can communicate directly with each other through the edge service provided by operator C, the user device 110 still cannot directly communicate end-to-end with a registered user of the operator C (for example, the user device 120).

SUMMARY

The disclosure provides a method for assisting an unregistered user device to access an end-to-end call service of a private network, which is suitable for a communication system of mobile edge computing. The method includes: determining by a mobile edge computing server whether the user device that is not registered on the private network wants to initiate an emergency-call request; and in response to the mobile edge computing server determining that the user device that is not registered on the private network wants to initiate the emergency-call request, assisting the user device by the mobile edge computing server to access the end-to-end call service without being registered on the private network.

The disclosure provides a communication system for assisting an unregistered user device to access an end-to-end call service of a private network, which includes a mobile edge computing server. The mobile edge computing server is configured to: determine whether the user device that is not registered on the private network wants to initiate an emergency-call request; and in response to determining that the user device that is not registered on the private network wants to initiate an emergency call, assist the user device to access the end-to-end call service without being registered on the private network.

DESCRIPTION OF THE EMBODIMENTS

Figure 2:
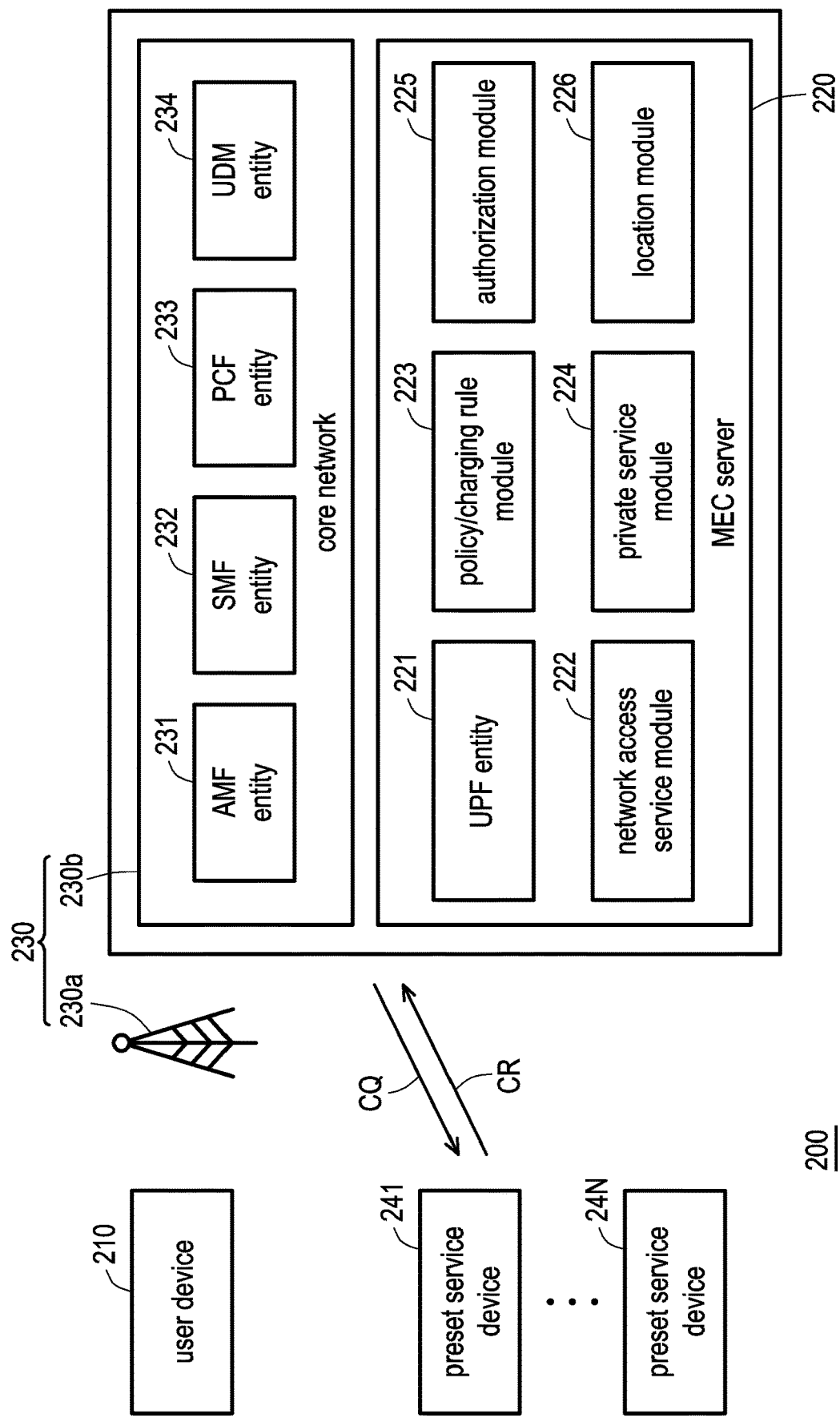
FIG. 2 is a schematic diagram of a communication system according to an embodiment of the disclosure.

Please refer to FIG. 2, which is a schematic diagram of a communication system according to an embodiment of the disclosure. As shown in FIG. 2, a communication system 200 includes a user device 210, a mobile edge computing (MEC) server 220, and a private network 230.

In different embodiments, the user device 210 is, for example, smart devices/computer devices with communication functions, but it is not limited thereto. In FIG. 2, the private network 230 may include a base station 230a and a core network 230b. In one embodiment, the private network 230 is, for example, a private network operated based on the 5th generation communication system (hereinafter referred to as 5G). In this scenario, the base station 230a is, for example, commonly known as gNB, and the core network 230b is, for example, commonly known as 5GC (5G CORE), but it is not limited thereto.

In the embodiment of the disclosure, the core network 230b may include an access and mobility management function (AMF) entity 231, a session management function (SMF) entity 232, a policy control function (PCF) entity 233, and a unified data management (UDM) entity 234. Please refer to relevant 5G specifications for their features/functions, which are not described here.

In addition, the MEC server 220 may include a user plane function (UPF) entity 221, a network access service module 222, policy/charging rules module 233, a private service module 224, an authorization module 225, and a location module 226.

In a different embodiment, the MEC server 220 and the core network 230b can be implemented as independent devices or can be implemented as different modules integrated in the same device, but it is not limited thereto.

In the embodiment of the disclosure, for user devices that have been registered on the private network 230, the MEC server 220 provides private services to these user devices through the private service module 224 (for example, an end-to-end call service between registered user devices).

For example, assuming that the service range of the private network 230 corresponds to an amusement park, the communication devices held by the employees of the amusement park can be planned as registered user devices of the private network 230. Therefore, those employees can communicate end-to-end with each other through the private service module 224 of the MEC server 220 with their own communication devices, but it is not limited thereto. In some embodiments, those employees can, for example, insert a SIM card registered on the private network 230 into the communication device they possess to make them registered user devices of the private network 230, but it is not limited thereto.

In the embodiment of the disclosure, it is assumed that the user device 210 (which is, for example, a communication device held by a tourist) is not registered on the private network 230, which makes the MEC server 220 unable to directly provide the private services to these user devices through the private service module 224 (such as the end-to-end call established between the user device 210 and the communication device of the aforementioned employee).

Figure 1A:
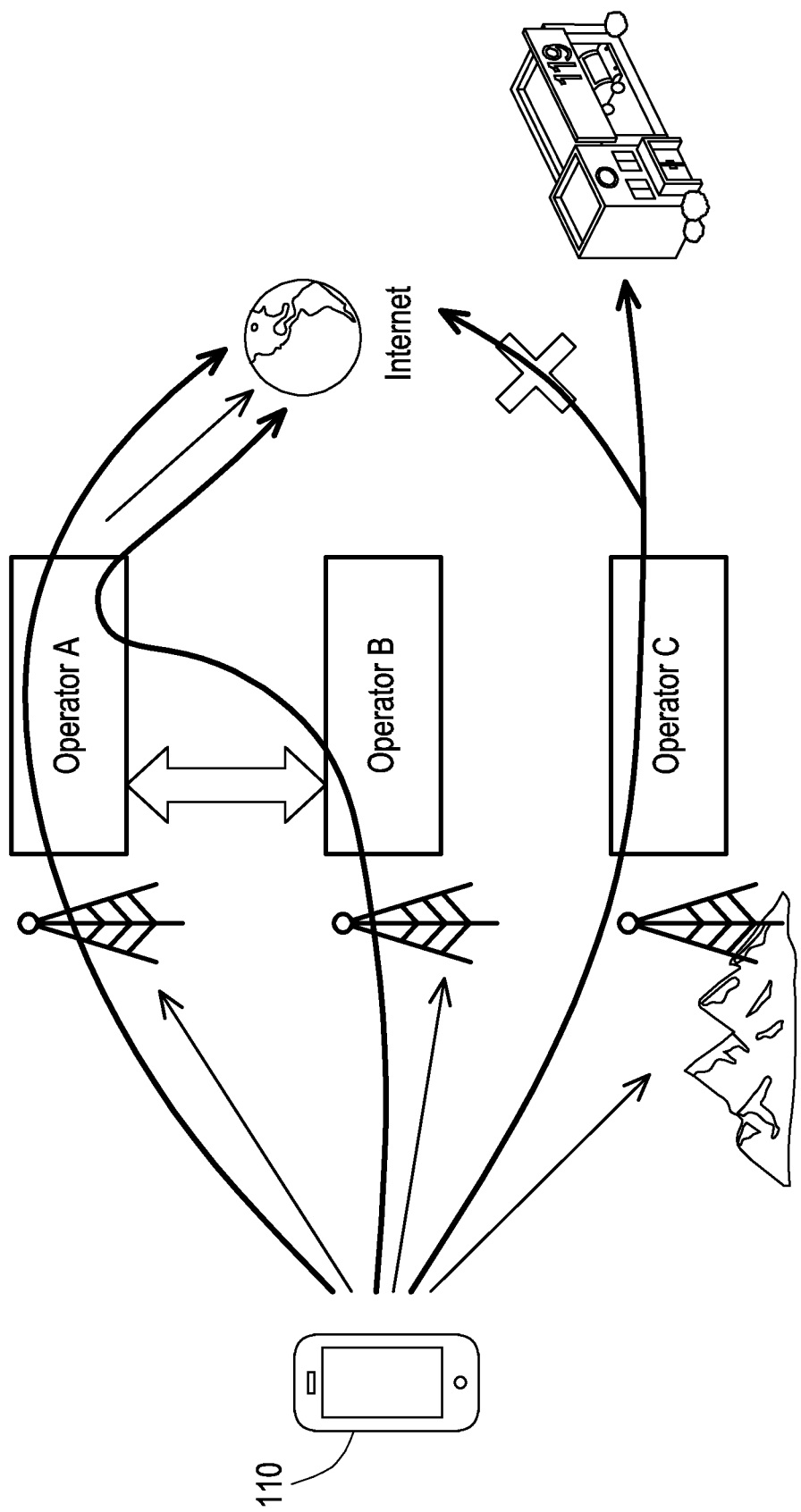
FIG. 1A is a schematic diagram of a conventional user device accessing the Internet.
Figure 1B:
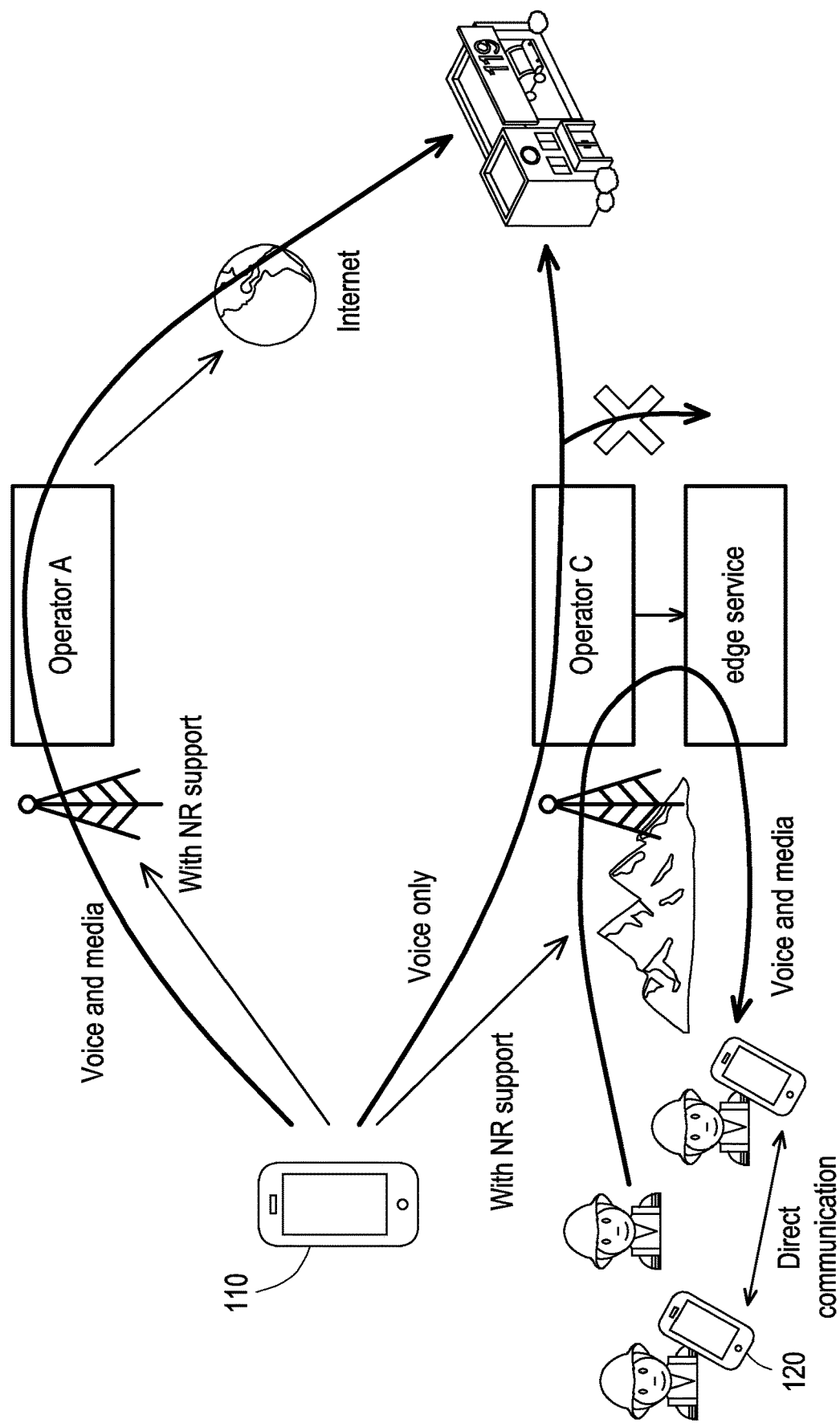
FIG. 1B is another schematic diagram of the conventional user device accessing the Internet according to FIG. 1A.

In one embodiment, it is assumed that the holder of the user device 210 wants to initiate an emergency call to contact the relevant medical care unit due to an emergency. In this scenario, the user device 210 will generally contact a general private medical care unit (such as a fire station outside an amusement park) through the mechanism shown in FIG. 1B. However, since most amusement parks have employees specializing in medical care, the emergency can be handled quickly by contacting the employees there. Therefore, if it is possible to design a mechanism that allows the user device 210 to directly make an end-to-end call with the user device held by the employee when initiating an emergency call, the emergency event can be handled more appropriately.

In view of this, the MEC server 220 of the disclosure solves the above technical problems by executing the method proposed by the disclosure, whose details are described in detail as follows.

Figure 3:
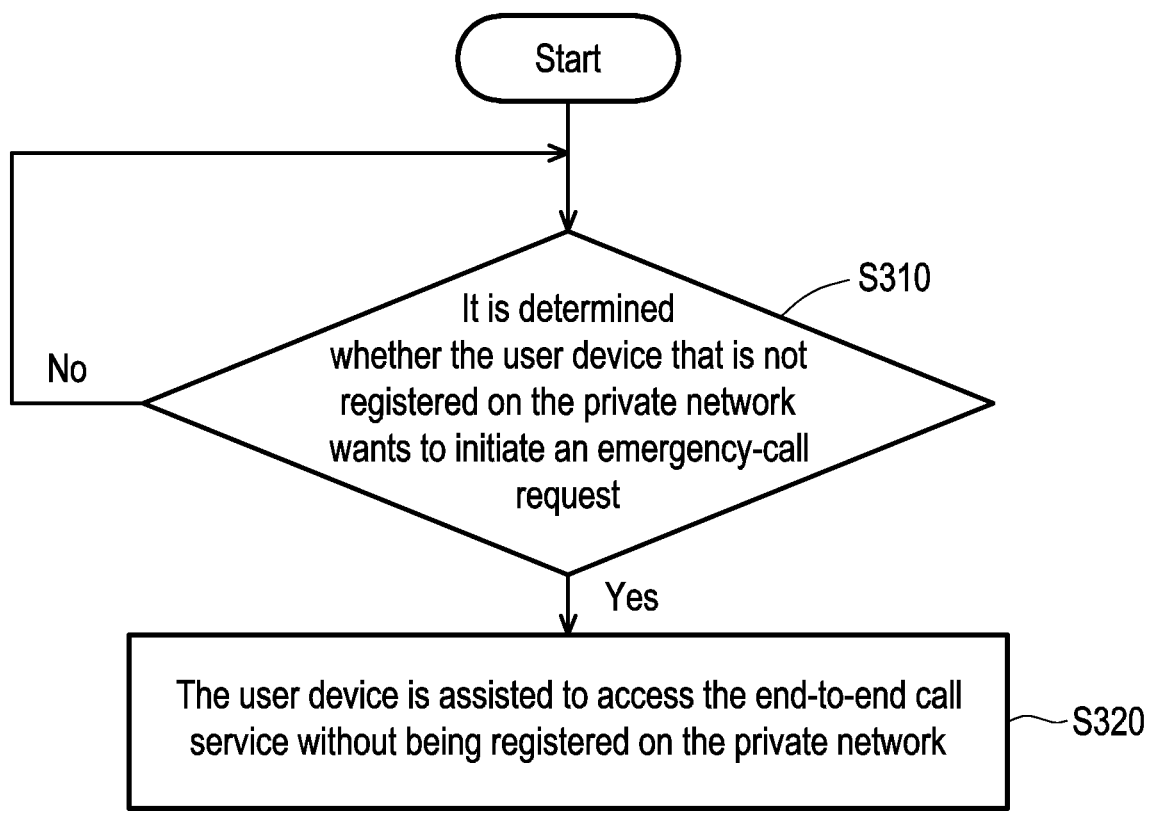
FIG. 3 is a flowchart of a method for assisting an unregistered user device to access an end-to-end call service of a private network according to an embodiment of the disclosure.

Please refer to FIG. 3, which is a flowchart of a method for assisting an unregistered user device to access an end-to-end call service of a private network according to an embodiment of the disclosure. The method of this embodiment may be executed by the MEC server 220 in FIG. 2 to assist the user device 210 that is not registered on the private network 230. The details of each step in FIG. 3 are described below with the components shown in FIG. 2.

First, in step S310, the MEC server 220 determines whether the user device 210 that is not registered on the private network 230 wants to initiate an emergency-call request. If yes, the MEC server 220 continues to execute step S320; otherwise, it executes step S310 again, but it is not limited thereto.

Figure 4:
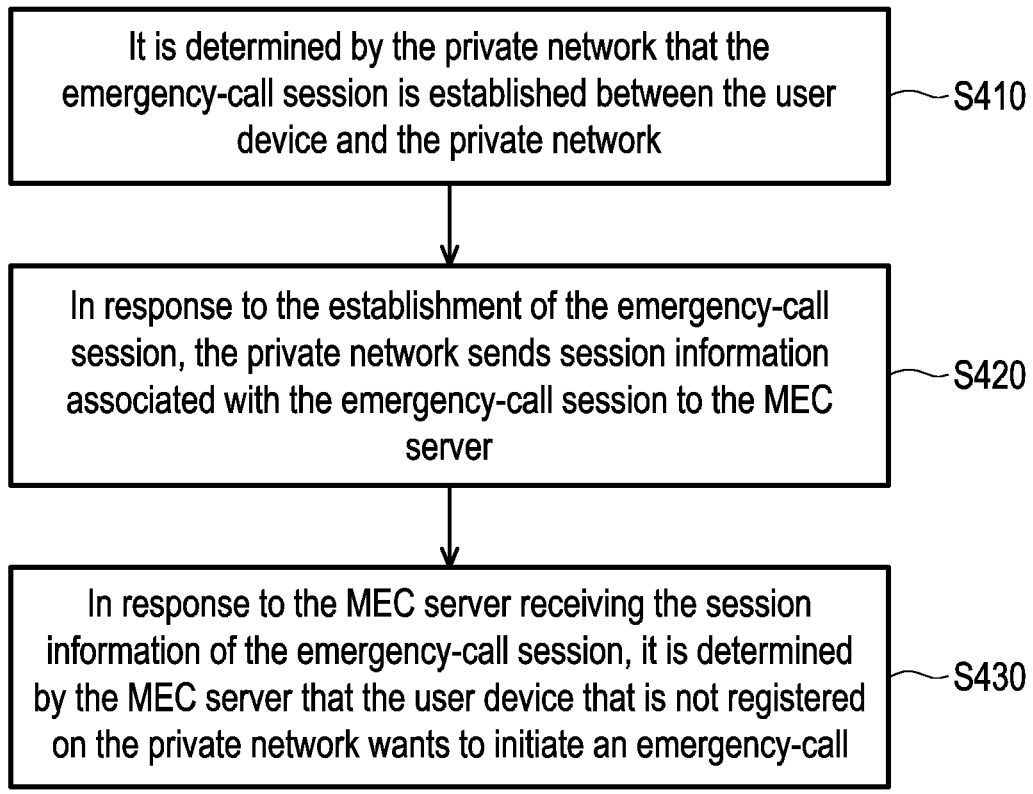
FIG. 4 is a flow chart of determining whether a user device wants to initiate an emergency-call request according to an embodiment of the disclosure.

In an embodiment, the MEC server 220 executes step S310 based on the process shown in FIG. 4. Please refer to FIG. 4, which is a flowchart of determining whether a user device wants to initiate an emergency-call request according to an embodiment of the disclosure. In the embodiment, when the user device 210 wants to initiate an emergency call, the user device 210 tries to establish an emergency-call session with the private network 230. In this scenario, the private network 230 may perform step S410 to determine that the emergency-call session is established between the user device 210 and the private network 230. Then, in step S420, in response to the establishment of the emergency-call session, the private network 230 sends session information associated with the emergency-call session to the MEC server 220. In one embodiment, the above-mentioned session information includes at least one of the Internet Protocol (IP) address of the user device 210, the session type (for example, an emergency one), and the quality of service flow identifier (QoS flow identifier, QFI).

Correspondingly, in step S430, in response to the MEC server 220 receiving the session information of the emergency-call session, the MEC server 220 determines that the user device 210 that is not registered on the private network 230 wants to initiate an emergency-call request, but it is not limited thereto.

Please refer to FIG. 3 again. After determining that the user device 210 wants to initiate an emergency-call request, the MEC server 220 may execute step S320 accordingly. In step S320, the MEC server 220 assists the user device 210 to access the end-to-end call service without being registered on the private network 230.

Figure 5:
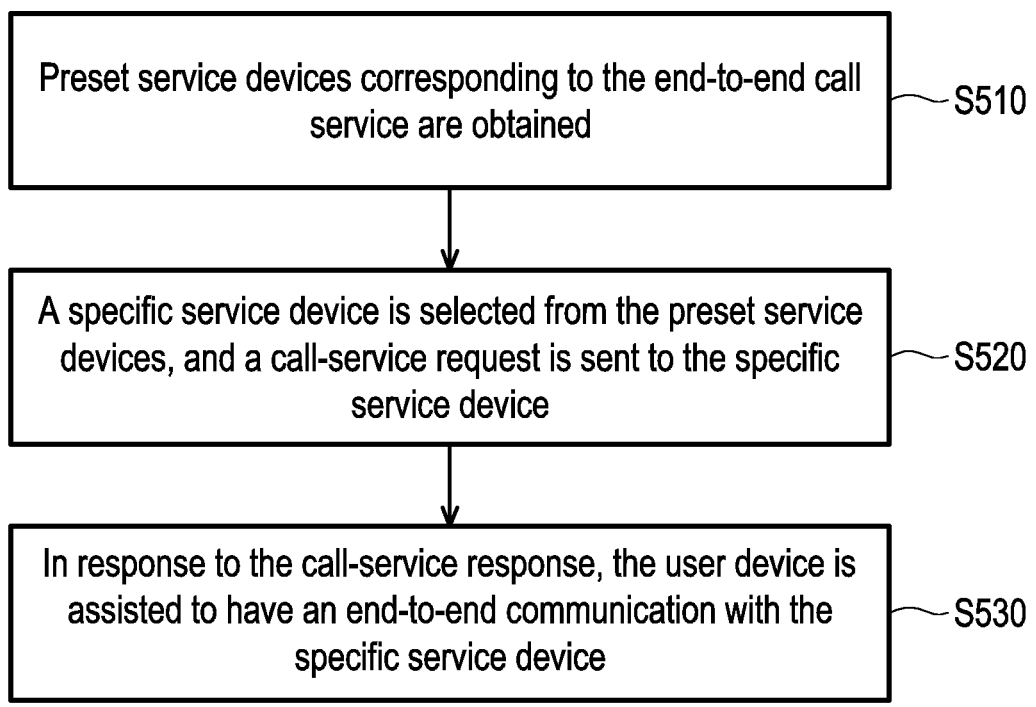
FIG. 5 is a flowchart of assisting a user device to access an end-to-end call service according to an embodiment of the disclosure.

In an embodiment, the MEC server 220 executes step S320 based on the flow shown in FIG. 5. Please refer to FIG. 5, which is a flowchart of assisting a user device to access an end-to-end call service according to an embodiment of the disclosure. First, in step S510, the private service module 224 obtains preset service devices 241 to 24N corresponding to the end-to-end call service. Each of the preset service devices 241 to 24N has been registered on the private network 230. In a different embodiment, the MEC server 220 selects the preset service devices 241 to 24N from the user devices registered on the private network 230 according to the principle set by the designers based on their requirements.

In one embodiment, it is assumed that the end-to-end conversation service provided by the MEC server 220 allows the user device 210 to make an end-to-end conversation with one of the preset service devices 241 to 24N registered on the private network 230. In this scenario, the private service module 224 obtains the preset service devices 241 to 24N corresponding to the end-to-end call service.

Then, in step S520, the private service module 224 selects a specific service device from the preset service devices 241 to 24N, and the PCF entity 233 of the private network 230 is required to send a call-service request CQ to the specific service device through a policy/charging rule module 223.

In one embodiment, the private service module 224 requests the location module 226 to analyze the locations of the preset service devices 241 to 24N in response to the aforementioned session information when determining that the user device 210 wants to initiate an emergency call. In an embodiment, after obtaining the location of the user device 210 and the location of each of the preset service devices 241 to 24N from the location module 226, the private service module 224 then finds out the closest service device to the user device 210 from the preset service devices 241 to 24N to be the specific service device. In other embodiments, the private service module 224 may also select a specific service device from the preset service devices 241 to 24N based on other principles. For example, the private service module 224 may also randomly select one of the preset service devices 241 to 24N to be the specific service device, but it is not limited thereto.

For the ease of description, it is assumed hereinafter that the preset service device 241 is the specific service device selected by the private service module 224 and is adapted for end-to-end calls. In this scenario, the PCF entity 233 may send a call-service request CQ to the preset service device 241 according to the above teaching. Correspondingly, the preset service device 241 sends a call-service response CR to the PCF entity 233 in response to the call-service request CQ, and the PCF entity 233 notifies the policy/charging rule module 223.

After that, in step S530, in response to the call-service response CR, the policy/charging rule module 223 triggers the private service module 224 to assist the user device 210 in having an end-to-end communication with the specific service device (i.e., the preset service device 241).

Figure 6:
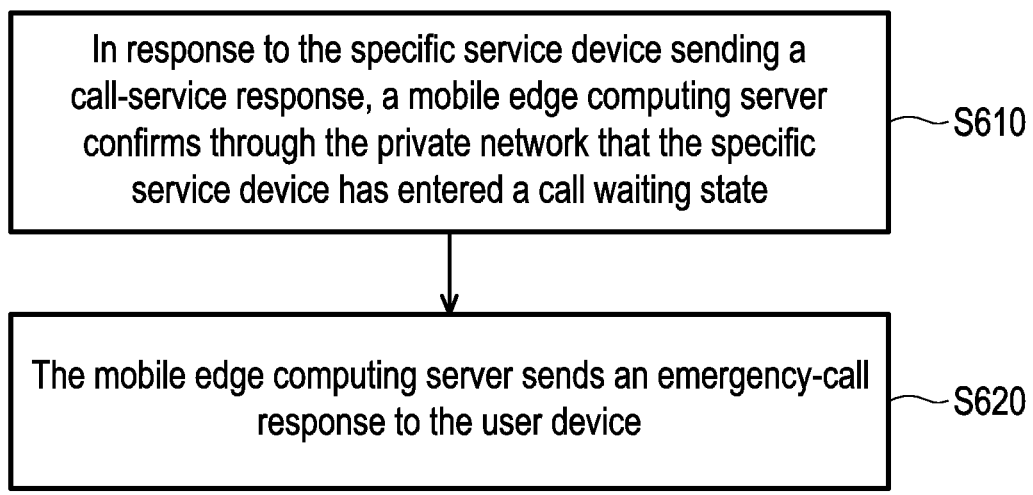
FIG. 6 is a flowchart of assisting a user device to perform an end-to-end call with a specific service device according to an embodiment of the disclosure.

In an embodiment, the MEC server 220 performs step S530 through the flowchart shown in FIG. 6. Please refer to FIG. 6, which is a flowchart of assisting a user device to perform an end-to-end call with a specific service device according to an embodiment of the disclosure. First, in step S610, in response to the specific service device sending a call-service response CR, the MEC server 220 confirms through the private network 230 that the specific service device has entered a call waiting state.

Then, in step S620, the MEC server 220 sends an emergency-call response to the user device 210, where the emergency-call response corresponds to the aforementioned emergency-call request. Correspondingly, the user device 210 performs an end-to-end call with the specific service device through the MEC server 220, but it is not limited thereto.

In one embodiment, the MEC server 220 first obtains information of a list of the amusement park employees who correspond to the emergency call services (such as medical staff), and then regards the user devices held by these employees as the preset service devices. After that, the MEC server 230 finds the closest one to the user device 210 from these preset service devices to be the specific service device, and then establishes an end-to-end call between the user device 210 and the specific service device. In this way, tourists who need emergency call service can find the nearest medical staff to assist with the emergency through the end-to-end call service, but it is not limited thereto.

In addition, the MEC server 220 may also regard all user devices registered on the private network 230 as the preset service devices, and then select the one closest to the user device 210 as the specific service device. In this way, the MEC server 220 allows the user device 210 to directly find any preset service device closest to the user device 210 to conduct an end-to-end call with the user device 210 after the emergency call is initiated (for example, the amusement park employee closest to the user device 210 is found to handle the emergency).

Although it is assumed that the service range of the private network 230 corresponds to an amusement park, it is used as an example and it is not intended to limit the possible implementations of the disclosure. In other embodiments, the service range of the private network 230 may be designed to correspond to a field in any form, such as a factory or a national park, based on the needs of the designer.

Upon this basis, any user device 210 located in the service range of the private network 230 that is not registered on the private network 230 may adopt the above process to make end-to-end calls with the registered user devices (which are held, for example, by factory employees or by national park staff) of the private network 230.

In summary, the embodiments of the disclosure allows the MEC server to assist a user device that is not registered on the private network to make an end-to-end call with a preset service device registered on the private network upon determining that the user device not registered on the private network wants to initiate an emergency call. In this way, when the user device initiates an emergency call, the end-to-end call is made to a closer preset service device instead of trying to contact a relatively distant unit (such as a private fire station). Thus, the emergency is dealt with in a more immediate manner, thereby reducing the impact of emergency.

Although the disclosure has been disclosed in the above embodiments, they are not intended to limit the disclosure. Anyone with common, general knowledge in the art can make changes and modifications without departing from the spirit and scope of the disclosure. The scope of the disclosure shall be determined by the scope of the claims.

What is claimed is:

1. A method for assisting an unregistered user device to access an end-to-end call service of a private network, which is suitable for a communication system using mobile edge computing, and the method comprising:

determining by a mobile edge computing server whether the user device that is not registered on the private network wants to initiate an emergency-call request; and in response to determining that the user device that is not registered on the private network wants to initiate the emergency call, assisting the user device by the mobile edge computing server to access the end-to-end call service without being registered on the private network, comprising:

obtaining at least one preset service device corresponding to the end-to-end call service, wherein each of the at least one preset service device has been registered on the private network;

selecting a specific service device from the at least one preset service device by the mobile edge computing server, and sending a call-service request by the mobile edge computing server to the specific service device, wherein the specific service device sends a call-service response in response to the call-service request; and in response to the call-service response, assisting the user device by the mobile edge computing server in performing an end-to-end call with the specific service device.

2. The method according to claim 1, wherein the communication system further comprises the private network, and the method further comprises:

determining by the private network that an emergency-call session is established between the user device and the private network; and in response to establishing the emergency-call session, sending session information associated with the emergency-call session by the private network to the mobile edge computing server.

3. The method according to claim 1, wherein performing the end-to-end call with the specific service device comprises:

in response to the specific service device sending the call-service response, confirming by the mobile edge computing server through the private network that the specific service device has entered a call waiting state; and sending an emergency-call response by the mobile edge computing server to the user device, wherein the emergency call responds to the request corresponding to the emergency call, and the user device performs the end-to-end call with the specific service device through the mobile edge computing server.

4. The method according to claim 2, wherein in response to the mobile edge computing server receiving the session information of the emergency-call session, the mobile edge computing server determines that the user device that is not registered on the private network wants to initiate the emergency call.

5. The method according to claim 4, further comprising:
in response to determining that the user device that is not registered on the private network wants to initiate the emergency call, analyzing a location of at least one preset service device by the mobile edge computing server based on the session information, wherein each of the at least one preset service device has been registered on the private network.

6. The method according to claim 2, wherein the session information of the emergency-call session comprises at least one of an Internet protocol address of the user device, a session type, and a quality of service flow identifier.

7. The method according to claim 1, wherein the specific service device is closest to the user device among the at least one preset service device.

8. A communication system for assisting an unregistered user device to access an end-to-end call service of a private network, comprising:
a mobile edge computing server, configured to:
determine whether the user device that is not registered on the private network wants to initiate an emergency-call request; and
in response to determining that the user device that is not registered on the private network wants to initiate the emergency call, assist the user device to access the end-to-end call service without being registered on the private network, comprising:
obtaining at least one preset service device corresponding to the end-to-end call service through a private service module corresponding to the end-to-end call service, wherein each of the at least one preset service device has been registered on the private network;
selecting a specific service device from the at least one preset service device through the private service module, and request a policy control function entity of the private network to send a call-service request to the specific service device through a policy/charging rule module of the mobile edge computing server, wherein the specific service device sends a call-service response in response to the call-service request; and
in response to the call-service response, triggering the private service module through the policy/charging rule module to assist the user device in performing an end-to-end call with the specific service device.

9. The communication system according to claim 8, wherein the communication system further comprises the private network, and the private network is further configured to:
determine that an emergency-call session is established between the user device and the private network; and
in response to establishing the emergency-call session, send session information associated with the emergency-call session to the mobile edge computing server.

10. The communication system according to claim 9, wherein the mobile edge computing server is configured to:
in response to the specific service device sending the call-service response, confirm by the mobile edge computing server through the private network that the specific service device has entered a call waiting state; and
send an emergency-call response by the mobile edge computing server to the user device, wherein the emergency call responds to the request corresponding to the emergency call, and the user device performs the end-to-end call with the specific service device through the mobile edge computing server.

11. The communication system according to claim 9, wherein the mobile edge computing server is further configured to:
in response to receiving the session information of the emergency-call session, determine that the user device that is not registered on the private network wants to initiate the emergency call.

12. The communication system according to claim 11, wherein the mobile edge computing server is further configured to:
in response to determining that the user device that is not registered on the private network wants to initiate the emergency call, analyze a location of the at least one preset service device by the mobile edge computing server based on the session information, wherein each of the at least one preset service device has been registered on the private network.

13. The communication system according to claim 9, wherein the session information of the emergency-call session comprises at least one of an Internet protocol address of the user device, a session type, and a quality of service flow identifier.

14. The communication system according to claim 8, wherein the specific service device is closest to the user device among the at least one preset service device.

* * * * *